US007512159B2

(12) United States Patent
Walker et al.

(10) Patent No.: US 7,512,159 B2
(45) Date of Patent: Mar. 31, 2009

(54) METHOD FOR VARIABLE PERFORMANCE IN COMMUNICATION SYSTEMS

(75) Inventors: Glenn A. Walker, Greentown, IN (US); Eric A. Dibiaso, Kokomo, IN (US); Michael L. Hiatt, Jr., Westfield, IN (US)

(73) Assignee: Delphi Technologies, Inc, Troy, MI (US)

( * ) Notice: Subject to any disclaimer, the term of this patent is extended or adjusted under 35 U.S.C. 154(b) by 769 days.

(21) Appl. No.: 10/931,665

(22) Filed: Sep. 1, 2004

(65) Prior Publication Data

US 2006/0045140 A1    Mar. 2, 2006

(51) Int. Cl.
*H04J 3/22* (2006.01)
(52) U.S. Cl. ...................................... 370/543; 370/538
(58) Field of Classification Search ........................ None
See application file for complete search history.

(56) References Cited

U.S. PATENT DOCUMENTS

| | | | | |
|---|---|---|---|---|
| 5,757,416 | A * | 5/1998 | Birch et al. | 725/144 |
| 6,885,679 | B1 * | 4/2005 | Cheong et al. | 370/470 |
| 2005/0180509 | A1 * | 8/2005 | Olivieri et al. | 375/240.26 |

OTHER PUBLICATIONS

Bradley M J: "Digital Radio Mondiale: system and receivers", Ninth International Conference On JF Radio Systems and Techniques, 2003, pp. 198-202, XP002493874, London, UK.
Hansen C, et al: Digital radio mondiale (drm) digital sound broadcasting in the am bands, IEEE Transactions On Broadcasting, IEEE Service Center, Piscataway, NJ, US, vol. 40, No. 3, Sep. 1, 2003, pp. 319-328, XP011101427.
"Digital Radio Mondiale (DRM): System Specification; ETSI ES 201 980", ETSI Standards, Lis, Sophia Antipolis, Cedex, France, vol. BC, No. V2.1.1, Jun. 1, 2004.

* cited by examiner

*Primary Examiner*—Thai D Hoang
(74) *Attorney, Agent, or Firm*—Jimmy L. Funke (57) ABSTRACT

The present invention generally relates to the transmission of digital data, and more particularly, to the transmission of digital data in a satellite digital audio radio ("SDAR") system. In the SDAR system, there may be different types of required services. Some of these services may be considered high priority and others may be of a lower priority. Current SDAR systems have the same performance on all user data. Therefore, there is a need to vary the performance of different services.

The present invention provides a method and apparatus for optimizing the throughput (i.e. information) in a digital transmission system by transmitting the different services with different performance levels. The present invention addresses the need in the art to vary the performance of different services (i.e., levels of data). Because the performance of the primary level of data will not be equal to the performance of the secondary level of data, the primary level will need to be further protected. The primary level data may be streaming data. The secondary level data does not need as much protection because it may be rebroadcast repeatedly. The easiest and most cost effective solution is to integrate multiple symbols for a secondary level bit. The present invention provides a method and apparatus in which the power level for the data levels can be set within each data packet using a message header providing the different services with different levels of performance.

21 Claims, 5 Drawing Sheets

METHOD FOR VARIABLE PERFORMANCE IN COMMUNICATION SYSTEMS

TECHNICAL BACKGROUND

The present invention generally relates to the transmission of digital data, and more particularly, to the transmission of digital data in a satellite digital audio radio ("SDAR") system.

BACKGROUND OF THE INVENTION

In October of 1997, the Federal Communications Commission (FCC) granted two national satellite radio broadcast licenses. In doing so, the FCC allocated 25 megahertz (MHz) of the electromagnetic spectrum for satellite digital broadcasting, 12.5 MHz of which are owned by XM Satellite Radio, Inc. of Washington, D.C. ("XM"), and 12.5 MHz of which are owned by Sirius Satellite Radio, Inc. of New York City, N.Y. ("Sirius"). Both companies provide subscription-based digital audio that is transmitted from communication satellites, and the services provided by these—and eventually other—companies (i.e., SDAR companies) are capable of being transmitted to both mobile and fixed receivers on the ground.

In the XM satellite system, two communication satellites are present in a geostationary orbit, each satellite is at a specific longitude and at a specific latitude. Accordingly, the satellites always seem to be positioned above the same spot on the earth. In the Sirius satellite system, however, three communication satellites are present that orbit the earth along specific longitudes and latitudes and, relative to the northern hemisphere, rise and set once a day (geosynchronous). Consequently, two of the three satellites are "visible" to receivers in the United States at all times. Since both satellite systems provide audio data to mobile receivers in urban canyons and other high population density areas with limited line-of-sight satellite coverage, both systems use terrestrial repeaters to receive and re-broadcast the same user data that is transmitted by the respective satellite systems.

In some communication systems (especially digital), there may be different types of services, that is types of information transmitted as the user data. Some of these services may be considered high priority and others may be of a lower priority. Current SDAR systems provide the same level of priority on all user data.

SUMMARY OF THE INVENTION

The present invention provides a method and apparatus for optimizing the throughput (i.e. information) in a digital transmission system by transmitting the different services with different performance levels. Traditionally, local communication was done over wires because this presented a cost-effective way of ensuring a reliable transfer of information. Transmission of information over radio waves was needed for long-distance communications. This type of transmission raised doubts over the corruption of the information and was often dependent on high-power transmitters to overcome weather conditions, large buildings, and interference from other sources.

More recently with the advent of low-cost microcontrollers and the introduction of domestic mobile telephones and satellite communications, digital modulation has gained in popularity. Modulation is the process of modifying one or more of the attributes of the radio wave (carrier) in accordance with the information to be conveyed. Demodulation is the reciprocal process carried out in the receiver in order to reconstruct the original information. This information could be, for example, computer data, audio data or a television program. Different modulation techniques, such as A.M. (amplitude modulation), F.M. (frequency modulation), and P.M. (phase modulation), represent different ways to shape or form electromagnetic radio waves. There are many reasons to modulate a signal in a particular way. Amplitude modulation produces a simple, robust wave that doesn't use much spectrum or radio bandwidth and is simpler to demodulate. However, it is plagued by noise and requires high transmitting power. Frequency modulation, such as analog cell phones use, provides better sound but it needs more bandwidth to achieve that quality and is technically more complex to produce. The various modulation techniques offered different solutions in terms of cost-effectiveness and quality of received signals but until recently were still largely analog. With digital modulation techniques, such as GSM and IS-136, come all the advantages that traditional microprocessor circuits have over their analog counterparts. Many shortfalls in the communications link can be compensated or eradicated by using digital techniques.

In digital communication systems, there may be different types of required services. Some of these services may be considered high priority and others may be of a lower priority. For example, music/video data may require higher performance than message data (i.e. streaming data vs. repeated data). Current SDAR systems have the same performance on all user data. The present invention addresses the need in the art to vary the performance of different services (i.e., levels of data). Because the performance of the primary level of data will not be equal to the performance of the secondary level of data, the primary level will need to be further protected. The primary level data may be streaming data. The secondary level data does not need as much protection because it may be rebroadcast repeatedly. The easiest and most cost effective solution is to integrate multiple symbols for a secondary level bit. Another method would be to use different forward error correction algorithms.

The present invention provides a method and apparatus where the protection given can be varied by data packets or data frames. Although data can be transmitted one character at a time, it is more efficient to send information in larger blocks called data packets or frames. The present invention provides a method and apparatus unlike other systems today. For example, the maximum data rate of a modem is limited by the available frequency range (bandwidth) and signal-to-noise ratio (SNR). Noise may be defined as the combination of unwanted interfering signal sources such as cross-talk or radio frequency interference. Noise impairs the detection of the smallest analog levels that may be resolved. If more bandwidth or SNR is available to the modem, more bits may be transferred per second. The better the margin (the difference between the signal and the noise) the easier it is for the modem to pick out the signal from the background noise. However, once the margin is set, it will not be changed during the connection. The present invention provides a method and apparatus in which the power level for the data levels can be set within each data packet providing the different services with different levels of performance.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein.

DESCRIPTION OF INVENTION

The embodiments disclosed below are not intended to be exhaustive or limit the invention to the precise forms disclosed in the following detailed description. Rather, the embodiments are chosen and described so that others skilled in the art may utilize their teachings.

For the purposes of the present invention, certain terms shall be interpreted accordance with the following definitions.

"Hierarchical modulation" hereinafter describes when two separate data or bit streams are modulated onto a single transmission stream. Essentially, a "high priority" stream is superimposed upon, mapped on, or embedded within a "low priority" data stream (or vice versa). The high priority stream may have a lower data rate than the low priority stream while also being more robust. By using a lower code rate (i.e., the ratio of the transmitted bit rate to the useful bit rate) the bits of the high priority stream may also be transmitted with a greater error protection than those bits of the low priority stream. Broadcasters of SDAR services may also use the high and low priority streams to target different types of receivers.

"First level data," or "primary data" hereinafter refers to existing data that may be interpreted by current (i.e., "legacy") SDAR receivers. First level, or primary, data may either perform the same as or differently from second level, or secondary, data.

"Second level data," "secondary data," and/or "hierarchical data" hereinafter refers to the additional data that is superimposed on the first level data to create a hierarchical modulated data stream. Second level, or secondary, data may either perform the same as (e.g., lower data rate) or perform differently from (e.g., higher data rate) first level, or primary, data.

Figure 1:
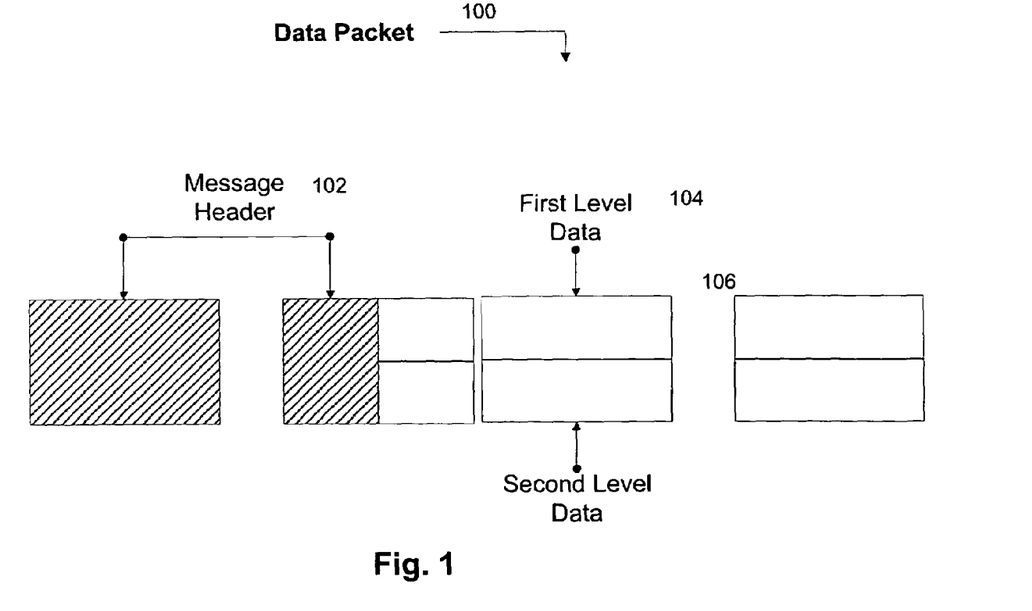
FIG. 1 is a schematic diagram of a data packet.

The formatting of data possible with the present invention may be embodied in a schematic format as shown in FIG. 1. Although data can be transmitted one character at a time, it is more efficient to send information in larger blocks called data packets 100. FIG. 1 shows message header 102 and two levels of data 104, 106. Message header 102 is typically located at the beginning of data packet 100 and contains information regarding data packet 100, which may include format and coding information. First level data 104 and second level data 106 are shown representing different types of required services. Message header 102 may be broken into separate first and second headers or the message header for 106 may be included in reserved bits in 104.

The present invention includes a method for receiving a data transmission signal and determining the beginning and end of a data packet. A digital transmission system is a transmission system in which all circuits carry digital (i.e. characterized by discreet states) signals and the signals are combined into one or more serial bit streams. Data is transmitted in blocks called data packets. Once the beginning and ending of the data packet have been determined, the data packet is then decoded. The decoding process involves differentiating between two levels of data and separately demodulating each of the two levels of data (demodulation may also include forward error correction (FEC) decoding). The two levels of data may be different types of required services.

In another form of the present invention, a method is provided that uses a message header. A message header (or packet header) is control information placed before data when encapsulating that data for network transmission. The process involves decoding the data packet by differentiating between a message header and two levels of data in the data packet. The message header may include information about the data packet and error checking information. In the present invention, the message header will also include instructions for decoding the two levels of data. The message header will be read according to an established protocol. The next step is demodulating the two levels of data according to the instructions given in the message header.

Figure 2:
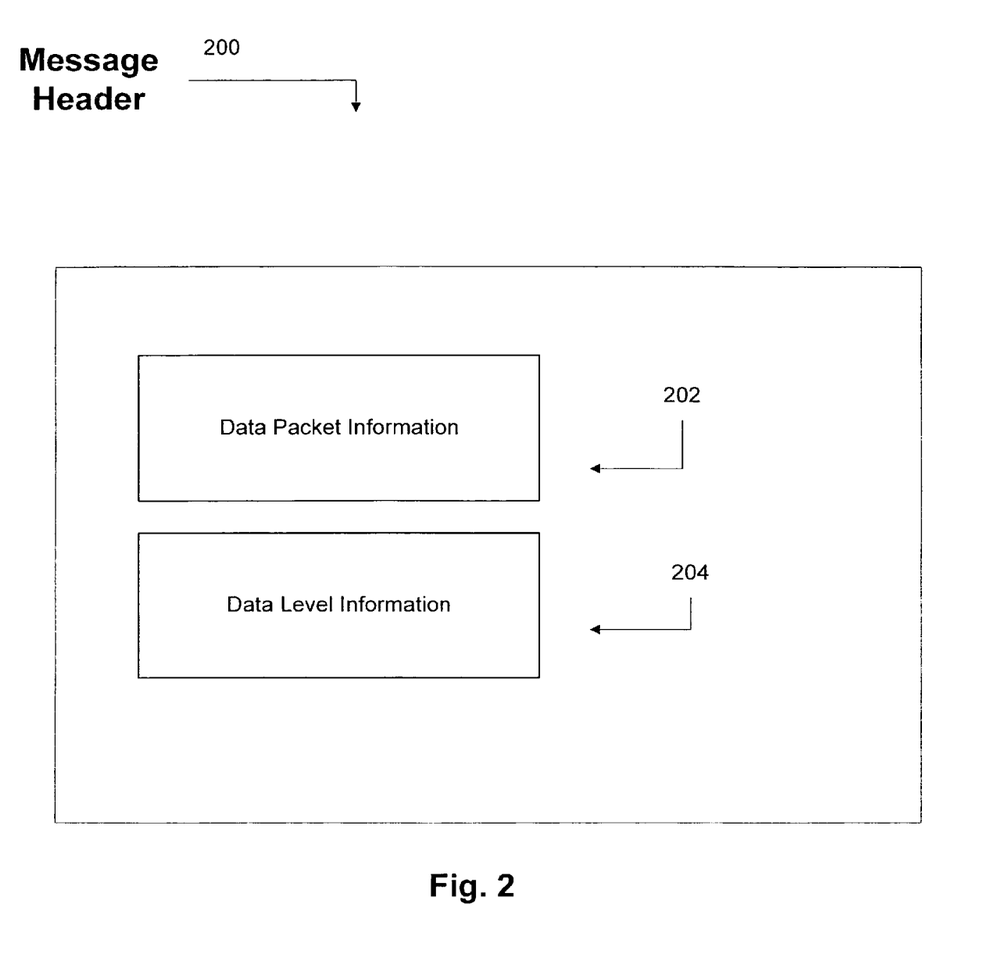
FIG. 2 is a schematic diagram of a message header.

One example schematic for a message header or packet header is depicted in FIG. 2. FIG. 2 depicts message header 200 with two different types of information: data packet information 202 and data level information 204. Data packet information 202 includes instructions about the data carried by the packet. These instructions may include: length of packet, packet number (which packet this is in a sequence of packets), protocol (on networks that carry multiple types of information, the protocol defines what type of packet is being transmitted), destination address (where the packet is going), and originating address (where the packet came from). Data level information 204 includes instructions on demodulating the two levels of data. The two levels of data may be provided with a different energy per symbol levels providing different service priorities for the respective levels.

In another form of the present invention, a method for decoding the two levels of data encoded with a different amount of energy per symbol is provided. In some communication systems, there may be different types of services having different priority levels. In a communication system that has known timing information, i.e. where different services are known in the transmission, each service can be optimized for the desired level of priority and performance. This optimization can be accomplished by using the same detection circuitry for each type of information. By integrating the received signal for different periods of time, each piece of information can have a different energy level. This would work especially well for hierarchical modulation systems where the secondary level symbol energy is not as large as the primary level symbol energy. This allows adjustment of the secondary level symbol energy to minimize the degradation seen by legacy receivers that only process the primary level symbol energy.

In still another form of the present invention, a method is provided which further comprises the steps of monitoring periodically for symbols in one of the two levels of data and determining the receipt of specific information in the second level of data and transmitting the specific information in the second level of data to an information device, such as an SDAR receiver. The specific information may include static rebroadcast data such as current time, weather updates, and news updates. Puncture codes (a type of forward error correction) can be used to minimize the time required to receive rebroadcast data (Digital Fountain is one example of a Puncture code).

Figure 3:
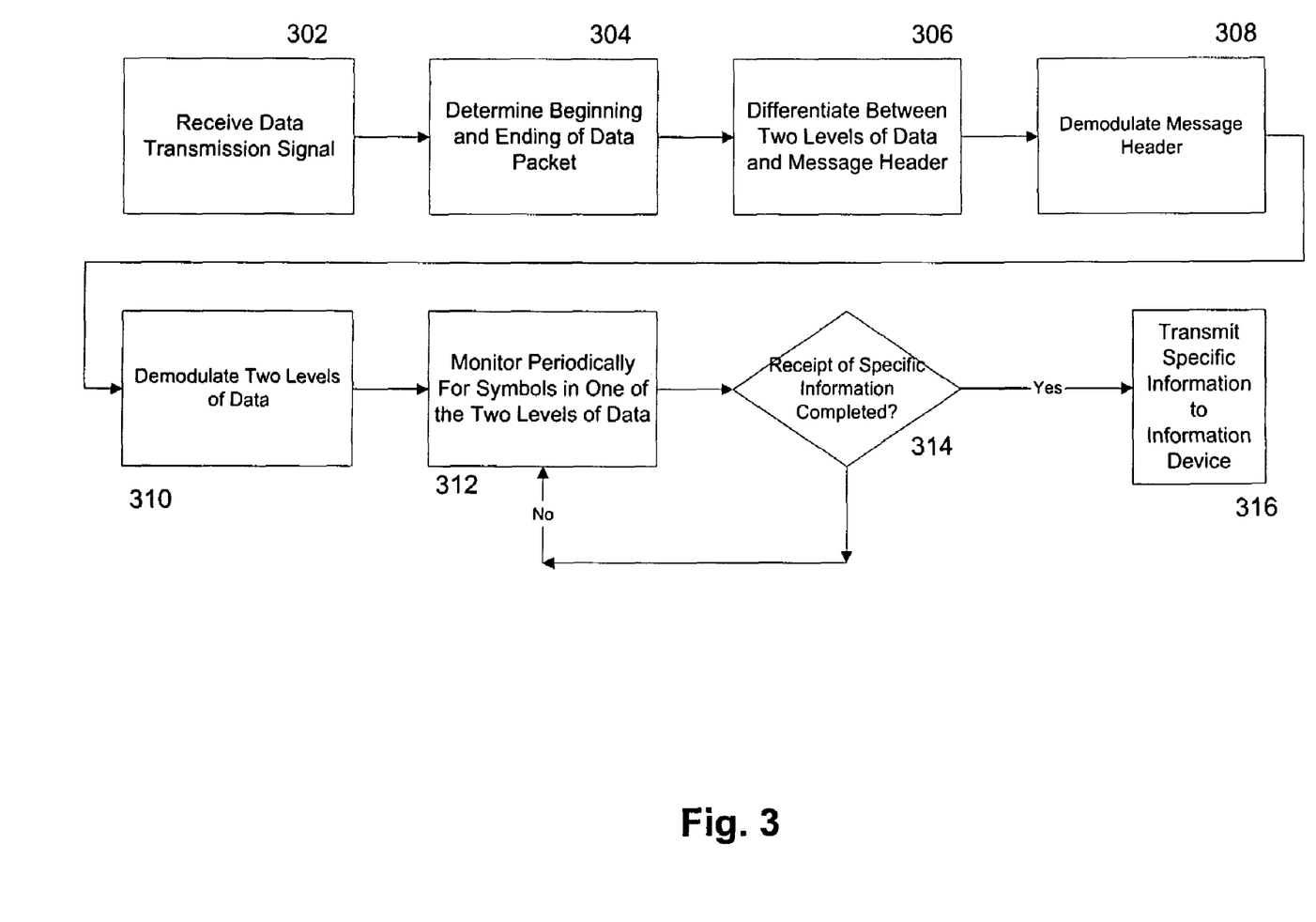
FIG. 3 is a flow chart diagram of the inventive method for receiving.

An embodiment of this inventive method of receiving and decoding such transmissions is shown in FIG. 3. First, the data transmission signal is received (302). The beginning and ending of data packet is determined (304). The next step is to differentiate between the two levels of data and message header (306) and to demodulate the message header to determine the two levels of data and instructions for decoding the two levels of data (308). Next, the two levels of data, which are encoded with a different amount of energy per symbol, are demodulated according to instructions read from the message header (310). The next step is to monitor periodically for symbols in one of the two levels of data (312) and when receipt of the specific information is completed (314), the specific information is transmitted to an information device (316). In the case of streaming data, (312) passes the data directly to (316).

In another form of the present invention, an apparatus for receiving a data packet in a digital transmission system is provided. The apparatus includes a digital transmission receiver, including a device for determining the beginning and end of a data packet. The apparatus further includes a signal decoder to differentiate between the two levels of data. The two levels of data may include different types of services. The apparatus further includes a device for demodulating each of the two levels of data.

In still another form of the present invention, an apparatus with a signal decoder for differentiating between a message header and two levels of data in the data packet is provided. The signal decoder of the apparatus further includes a device for distinguishing the message header to determine the two levels of data and instructions for decoding the two levels of data. The apparatus further includes a device for demodulating the two levels of data according to the instructions read from the message header.

In another form of the present invention, an apparatus including a signal decoder with a device for decoding the two levels of data encoded with a different amount of energy per symbol. A level of data with more energy per symbol will have more protection from noise. Noise may be defined as the combination of unwanted interfering signal sources such as cross-talk or radio frequency interference.

In another form of the present invention, an apparatus including a monitor that periodically checks for a second level of data is provided. The monitor includes programming that determines the receipt of specific information in the second level of data. Static second level data may include such things as the current time, weather updates, or news updates. The monitor will continue checking for the second level of data and determine the receipt of specific information in the second level of data.

In another form of the present invention, an apparatus including a transmitter adapted to transmit the specific information in the second level of data to an information device is provided. Once the monitor determines the receipt of specific information in the second level of data, a transmitter will transmit the specific information in the second level of data to an information device. The second level of data will be rebroadcast and may include such things as the current time, weather updates, and news updates.

In still another form of the present invention, an apparatus including a signal discriminator is provided. The signal discriminator includes circuitry for determining the beginning and ending of a data packet. The signal discriminator is the part of the receiver that extracts the desired signal from an incoming wave. In order to demodulate a data packet, the beginning and ending of the data packet must first be determined.

In another form of the present invention, an apparatus including a signal comparator is provided. The signal comparator includes circuitry for determining the existence of a message header. If a message header exists, it will include instructions for demodulating the two levels of data.

Figure 5:
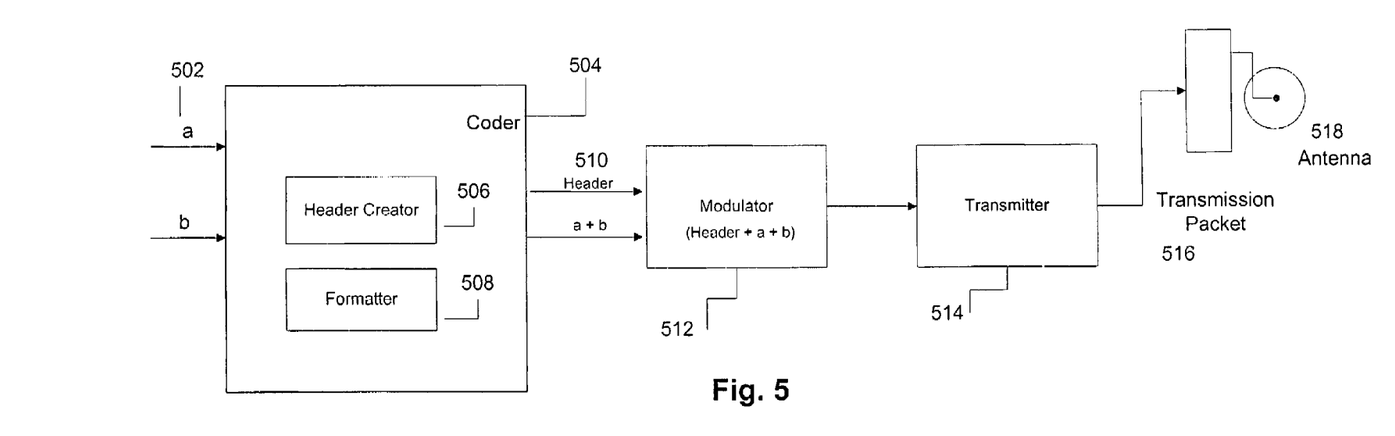
FIG. 5 is a diagrammatic representation of the inventive transmitting systems.
Figure 6:
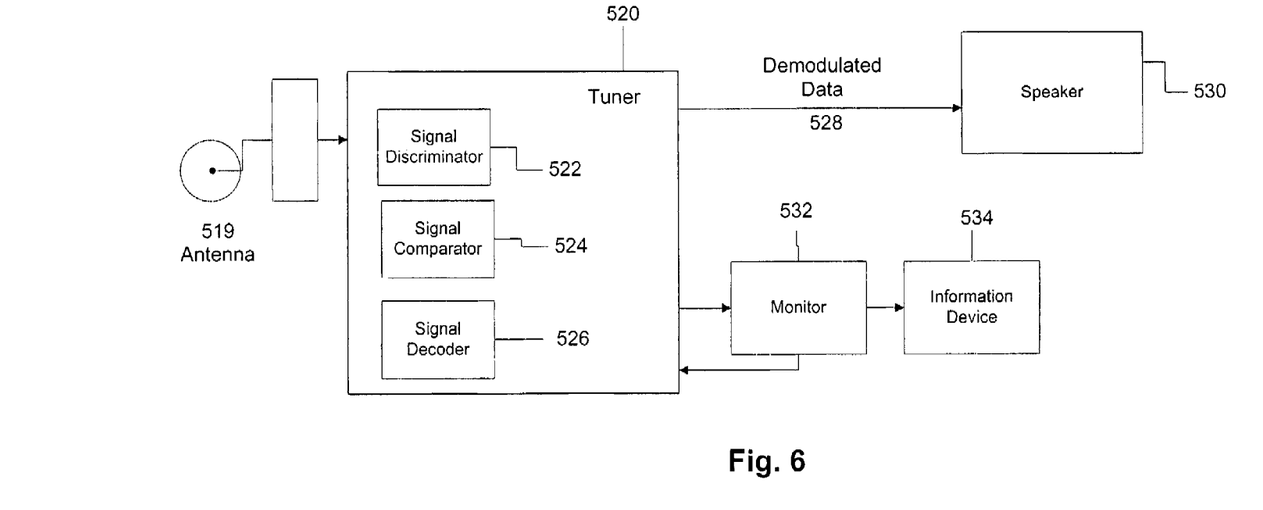
FIG. 6 is a diagrammatic representation of the inventive receiving systems.

A diagrammatic representation of the transmitting and receiving systems of the present invention are shown in FIG. 5 and FIG. 6. The transmitting system includes at least five components. The transmitting system includes coder 504 for encoding two levels of data (a and b, 502) with a different amount of energy per symbol (different levels of protection from noise). Header creator 506 includes circuitry adapted to create a message header (or packet header) including instructions for demodulating the data packets. Formatter 508 includes means for inserting instructions for demodulating the two levels of data into the message header 510. Modulator 512 may receive inputs 502 from coder 504 or alternative means. Modulator 512 is adapted to combine message header 510 and inputs 502 using PSK modulation. Transmitter 514 is adapted to transmit the modulated signal 516, possibly to antenna 518.

The receiving system of FIG. 6 includes at least seven components. Digital transmission receiver 520 is adapted to receive the modulated signal from a transmission, possibly utilizing antenna 519. Receiver 520 includes signal discriminator 522 and signal detector 524. Signal discriminator 522 includes circuitry for determining the beginning and ending of a data packet. Signal detector 524 includes circuitry for determining the existence of a message header coupled to signal discriminator. Receiver 520 also includes signal decoder 526, including circuitry for differentiating between two levels of data, and circuitry for demodulating each of the two levels of data. Receiver 520 sends demodulated data 528 to speaker 530. Monitor 532 periodically checks for a second level of data in the data packets received by the receiver. Monitor 532 includes programming which determines the completion of receipt of specific information in the second level of data. When the specific information data is fully received, the specific information is provided to information device 534.

In another form of the present invention, a method for transmitting a data packet having two different inputs in a digital transmission system is provided. The method comprises the steps of combining the inputs by modulating the inputs into data structured and arranged as a data packet and transmitting the modulated data packet. The first input may be streaming audio/visual data and the second input may be static data such as the current time, weather updates, or news updates. Modulating the inputs into a data packet will combine the two inputs and the data packet will then be transmitted.

In another form of the present invention, a method further comprising steps of combining a message header and inputs by modulating the message header and inputs using phase shift keying (PSK) into data structured and arranged as a data packet, is provided. PSK involves changing the phase of the transmitted waveform instead of the frequency. In its simplest form, a phase-modulated waveform can be generated by using the digital data to switch between signals of equal frequency but different phase.

In another form of the present invention, a method further comprising steps of encoding the inputs with a different amount of energy per symbol and inserting instructions for demodulating the two levels of data into the message header is provided. The two levels of data may require different levels of protection. To accomplish this, the primary level of data may be provided with a higher energy per symbol levels than the secondary level, giving the primary level more protection from noise (outside interferences).

Figure 4:
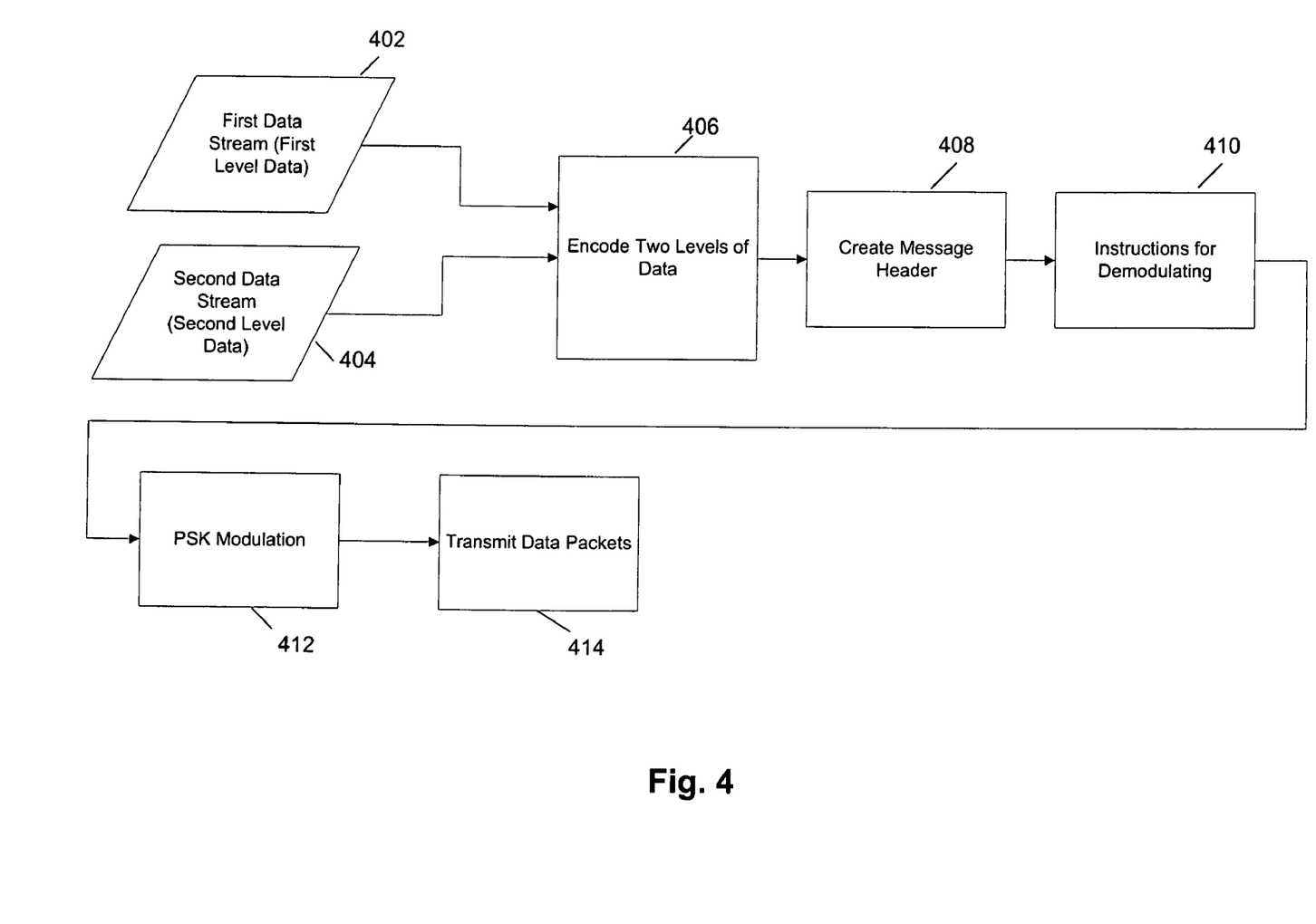
FIG. 4 is a schematic representation of the inventive method for transmitting.

These inventive method features are present in an exemplary embodiment of the invention shown in FIG. 4. Two input data streams (402, 404) are encoded with a different amount of energy per symbol (406). A message header is created including instructions for demodulating the data packets (408). The instructions for demodulating the two levels of data are inserted into the message header (410). The message header and inputs are combined using PSK modulation into a transmission packet (412). The packet is then transmitted (414).

In another form of the present invention, a method wherein the inputs include streaming audio/visual data as a first level of data and static data as a second level of data is provided. The primary level of data may include streaming audio/visual data deemed to require more protection. Since the assumption is the second level of data will be rebroadcast and is less important, it may be provided with a lower power level and, therefore, less protection.

In another form of the present invention, an apparatus for transmitting a data packet having two different inputs in a digital transmission system is provided. The apparatus includes a modulator adapted to combine inputs into data structured and arranged as a data packet and a transmitter adapted to transmit modulated data packets. A modulator is a device that imposes a signal (detectable transmitted energy that can be used to carry information) on a carrier. The first input may be streaming audio/visual data and the second input may be static data such as the current time, weather updates, or news updates. The modulator will combine the two inputs into a data packet. A transmitter will then transmit the modulated data packets containing the two levels of data.

In another form of the present invention, an apparatus further comprising circuitry adapted to create a message header including instructions for demodulating the data packets is provided. The modulator is adapted to combine the message header and inputs using phase shift keying (PSK) into data structured and arranged as a transmission packet. PSK involves changing the phase of the transmitted waveform instead of the frequency.

In still another form of the present invention, an apparatus further comprising a device for encoding each of the two levels of data with a different amount of energy per symbol, and with a device for inserting instructions for demodulating the two levels of data into message header is provided.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

We claim:

1. A method for receiving and processing a data packet containing at least two different levels of modulation in a digital transmission system, comprising the steps of:
   a. receiving a data transmission signal and determining the beginning and end of a data packet; and
   b. decoding the data packet by differentiating between a message header and two levels of data, demodulating the message header, and separately demodulating each of the two levels of data according to instructions contained in the header, said instructions including forward error correction rates for each data level within the packet.

2. The method of claim 1 further comprising the steps of:
   a. decoding the two levels of data encoded with a different amount of energy per symbol.

3. The method of claim 1 further comprising the steps of:
   a. monitoring periodically for symbols in one of the two levels of data.

4. The method of claim 3 further comprising the steps of:
   a. determining the receipt of specific information in the second level of data and transmitting the specific information in the second level of data to an information device.

5. An apparatus for receiving and processing a data packet containing least two different levels of modulation in a digital transmission system, said apparatus comprising:
   a. a digital transmission receiver, including circuitry for determining the beginning and end of a data packet; and
   b. a signal decoder, including circuitry for differentiating between a message header and two levels of data, means for demodulating the message header, and means for demodulating each of the two levels of data according to instructions contained in the header, wherein said instructions include forward error correction rates for each data level within the packet.

6. The apparatus of claim 5 wherein said signal decoder includes means for decoding the two levels of data encoded with a different amount of energy per symbol.

7. The apparatus of claim 5 further comprising:
   a. a monitor periodically checking for a second level of data, said monitor including programming that determines the receipt of specific information in the second level of data.

8. The apparatus of claim 7 further comprising:
   a. a transmitter adapted to transmit the specific information in the second level of data to an information device.

9. The apparatus of claim 5 further comprising:
   a. a signal discriminator, including circuitry for determining the beginning and end of a data packet.

10. The apparatus of claim 5 further comprising:
    a. a signal comparator, including circuitry for determining the existence of a message header.

11. A method for processing and transmitting a data packet having two different inputs and a message header in a digital transmission system, comprising the steps of:
    a. combining the inputs and the message header by modulating the inputs and the message header into data structured and arranged as a data packet wherein said message header contains instructions for demodulating the inputs into the two levels of data corresponding to said two inputs, said instructions including forward error correction rates for each input within the packet; and
    b. transmitting the modulated data packet.

12. The method of claim 11 further comprising the steps of:
    a combining the message header and inputs by modulating the message header and inputs using phase shift keying into data structured and arranged as a data packet.

13. The method of claim 11 further comprising the steps of:
    a. combining the message header and inputs using QPSK modulation into data structured and arranged as a data packet.

14. The method of claim 13 further comprising the steps of:
    a. encoding the inputs with a different amount of energy per symbol; and
    b. inserting instructions for demodulating the two levels of data into the message header.

15. The method of claim 11 wherein the inputs include streaming audio/visual data as a first level of data and static data as a second level of data.

16. An apparatus for processing and transmitting a data packet having two different inputs and a message header in a digital transmission system, said apparatus comprising:

a. modulator adapted to combine inputs and the message header into data structured and arranged as a data packet wherein said message header contains instructions for demodulating the inputs into two levels of data corresponding to said two inputs, said instructions including forward error correction rates for each input within the packet; and b. a transmitter adapted to transmit modulated data packets.

17. The apparatus of claim 16 further comprising:

a. circuitry adapted to create the message header including instructions for demodulating the data packets; said modulator is adapted to combine the message header and inputs using phase shift keying into data structured and arranged as a data packet.

18. The apparatus of claim 17 wherein said modulator is adapted to combine the message header and inputs using QPSK modulation into data structured and arranged as a data packet.

19. The apparatus of claim 17 further comprising:

a. circuitry for encoding each of the two levels of data with a different amount of energy per symbol, and with means for inserting instructions for demodulating the two levels of data into message header. pg,19

20. A method for receiving and processing a data packet containing at least two different levels of modulation in a digital transmission system, comprising the steps of:

a. receiving a data transmission signal and determining the beginning and end of a data packet;

b. decoding the data packet by differentiating between two levels of data, and separately demodulating each of the two levels of data; and c. decoding the data packet by differentiating between a message header and two levels of data in the data packet, demodulating the message header to determine the two levels of data and instructions for decoding the two levels of data, and demodulating the two levels of data according to the message header, said instructions including forward error correction rates for each data level within the packet.

21. An apparatus for receiving and processing a data packet containing at least two different levels of modulation in a digital transmission system, said apparatus comprising:

a. a digital transmission receiver, including circuitry for determining the beginning and end of a data packet; and b. a signal decoder, including circuitry for differentiating between two levels of data, and means for demodulating each of the two levels of data, wherein said signal decoder includes means for differentiating between a message header and two levels of data in the data packet, and means for distinguishing the message header to determine the two levels of data and instructions for decoding the two levels of data, and means for demodulating the two levels of data according to the message header, wherein said instructions include forward error correction rates for each data level within the packet.

* * * * *